US012370797B2

(12) United States Patent
Masuda

(10) Patent No.: US 12,370,797 B2
(45) Date of Patent: Jul. 29, 2025

(54) MAINTENANCE APPARATUS AND IMAGE RECORDING APPARATUS

(71) Applicant: BROTHER KOGYO KABUSHIKI KAISHA, Nagoya (JP)

(72) Inventor: Takehiro Masuda, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 163 days.

(21) Appl. No.: 18/182,905

(22) Filed: Mar. 13, 2023

(65) Prior Publication Data

US 2023/0294407 A1 Sep. 21, 2023

(30) Foreign Application Priority Data

Mar. 15, 2022 (JP) ................................ 2022-039826

(51) Int. Cl.
*B41J 2/165* (2006.01)

(52) U.S. Cl.
CPC ................................ *B41J 2/16517* (2013.01)

(58) Field of Classification Search
CPC ........................................................ B41J 2/165
See application file for complete search history.

(56) References Cited

U.S. PATENT DOCUMENTS 7,195,334 B2 3/2007 Nakamura
2007/0206048 A1* 9/2007 Kusunoki ............ B41J 2/16508 347/31
2008/0088666 A1 4/2008 Shindo et al.
2009/0027444 A1 1/2009 Yoshida et al.
2014/0118438 A1* 5/2014 Wall ....................... B41J 2/1752 347/32
2017/0291421 A1* 10/2017 Okuda ................. B41J 2/16505
2018/0244065 A1* 8/2018 Horade ................ B41J 2/16517
2019/0061353 A1* 2/2019 Shimizu ................... B41J 2/165

FOREIGN PATENT DOCUMENTS

EP 3960470 A2 3/2022
JP H08-276598 A 10/1996
JP 2007-320173 A 12/2007
JP 2008-094040 A 4/2008
JP 2008-168525 A 7/2008

(Continued)

OTHER PUBLICATIONS

Kamiyama, MachineTranslationofJP-2011101956-A, 2011 (Year: 2011).*

(Continued)

*Primary Examiner* — Scott A Richmond
(74) *Attorney, Agent, or Firm* — Baker Botts L.L.P.

(57) ABSTRACT

There is provided a maintenance apparatus for an image recording apparatus provided with a head having a nozzle configured to discharge a liquid. The maintenance apparatus includes: a foam configured to absorb the liquid discharged from the nozzle; an accommodating box which is opened upwardly and which accommodates the foam; and a plate configured to cover an upper part of the accommodating box. The plate has an opening configured to expose a part of an upper surface of the foam in a state that the plate is locked to the accommodating box.

17 Claims, 8 Drawing Sheets

(56) References Cited

FOREIGN PATENT DOCUMENTS

| | | | | |
|---|---|---|---|---|
| JP | 2011101956 | A | * | 5/2011 |
| WO | 2023/112163 | A1 | | 6/2023 |

OTHER PUBLICATIONS

European Patent Office, Extended European Search Report issued in European Patent Application No. 23161283.9, mailed Jul. 25, 2023.

Japan Patent Office; Notice of Reasons for Refusal issued in Japanese Patent Application No. 2022-039826, mailed Nov. 26, 2024 (5 pages).

* cited by examiner

MAINTENANCE APPARATUS AND IMAGE RECORDING APPARATUS

REFERENCE TO RELATED APPLICATIONS

This application claims priority from Japanese Patent Application No. 2022-039826 filed on Mar. 15, 2022. The entire content of the priority application is incorporated herein by reference.

BACKGROUND ART

There is a known image recording apparatus which is provided with a head and a carriage having the head mounted thereon, and which ejects or discharges an ink from nozzles of the head in a case that the carriage moves in a predetermined direction. In order to prevent the nozzles from being clogged, the image recording apparatus moves the carriage to a predetermined position (hereinafter referred to as a "flushing position") and performs a flushing processing of discharging the ink from the nozzles. A flushing box accommodating a foam is located below the carriage which has been moved to the flushing position. The foam is made, for example, of a porous material and absorbs the ink discharged from the nozzles of the head during the flushing.

DESCRIPTION

In a case that the distance between the foam and the head during the flushing is long, the ink discharged from the nozzles of the head is atomized (becomes to be in a fine mist form) and is diffused in the inside of the image recording apparatus, adheres to a part, a component, etc., and/or an inner wall of the image recording apparatus, and is dried at a position at which the atomized ink has adhered, in some cases. From this point of view, it is preferred that the distance between the foam and the head is short. On the other hand, in a case that the distance between the foam and the head is made to be too short, there arise such an inconvenience that the foam might make contact with a nozzle surface of the head.

Japanese Patent Application Laid-Open No. JP2008-168525A describes a liquid jetting apparatus provided with a liquid receiving body which receives a liquid jetted or discharged from nozzles of a head; a liquid absorbing member arranged in the inside of the liquid receiving body; and a suppressing member which is formed of a wire material or a mesh (net) material and which suppress any lifting or floating of the liquid absorbing member.

In the liquid jetting apparatus described in Japanese Patent Application Laid-Open No. JP2008-168525A, the suppressing member is formed of the wire material or the mesh material, and thus the ink discharged from the nozzles of the head during the flushing adheres to the suppressing member, and is dried on the suppressing member. Accordingly, there might arise such an inconvenience that the ink adhered to the suppressing member make contact with the nozzle surface of the head.

The present disclosure has been made in view of the above-described circumstances, and an object of the present disclosure is to provide a means capable of effectively suppressing any contact between the foam and the nozzle surface of the head even in a case that the distance between the foam and the head is made to be short.

(1) A maintenance apparatus according to an aspect of a present disclosure is a maintenance apparatus for an image recording apparatus provided with a head having a nozzle configured to discharge a liquid, the maintenance apparatus including: a foam configured to absorb the liquid discharged from the nozzle; an accommodating box which is opened upwardly and which accommodates the foam; and a plate configured to cover an upper part of the accommodating box. The plate has an opening configured to expose a part of an upper surface of the foam in a state that the plate is locked to the accommodating box.

According to the above-described maintenance apparatus, the plate having the opening is used so as to cover the upper part of the accommodating box, thereby making it possible to appropriately accommodate the foam while allowing the part of the upper surface of the foam to be exposed via the opening. Accordingly, even in a case that the distance between the foam and the head is maintained to be suitable and that the distance between the foam and the head is made to be short, it is possible to effectively suppress contact between the foam and the nozzle surface of the head.

(2) The opening of the plate may correspond at least to one nozzle row of the head.

(3) The opening of the plate may correspond at least to all of the nozzle of the head.

(4) An inner bottom surface of the accommodating box has a rib configured to support a bottom surface of the foam.

(5) An inner bottom surface of the accommodating box may have a recess which is recessed in an orientation of enlarging an internal space of the accommodating box.

(6) A first end of the plate may be fixed to the accommodating box via a plate spring;

a second end, of the plate, facing the first end may be locked to the accommodating box via a hook structure; and the plate spring may be configured to urge the plate in an orientation away from the upper part of the accommodating box.

(7) The maintenance apparatus may further include a liquid supplier configured to supply a cleaning liquid to the accommodating box.

(8) The plate may be configured to apply a downward force to the foam in the state that the plate is locked to the accommodating box.

(9) The plate may be made of a metal.

(10) The opening of the plate may have such a shape and a size that, in a state that the head and the foam are opposed to each other, all the nozzle of at least one nozzle row of the head is positioned inside the opening as seen in a direction in which the head and the foam are opposed to each other.

(11) The opening of the plate may have such a shape and a size that, in a state that the head and the foam are opposed to each other, all the nozzle of the head is positioned inside the opening as seen in a direction in which the head and the foam are opposed to each other.

(12) An image recording apparatus according to an aspect of a present disclosure includes: a head having a nozzle configured to discharge a liquid; a carriage configured to move in a state that the head is mounted on the carriage; and the maintenance apparatus any one of those described above.

According to the maintenance apparatus and the image recording apparatus of the present disclosure, it is possible to effectively suppress any contact between the foam and the nozzle surface of the head even in a case that the distance between the foam and the head is made to be short.

Figure 1:
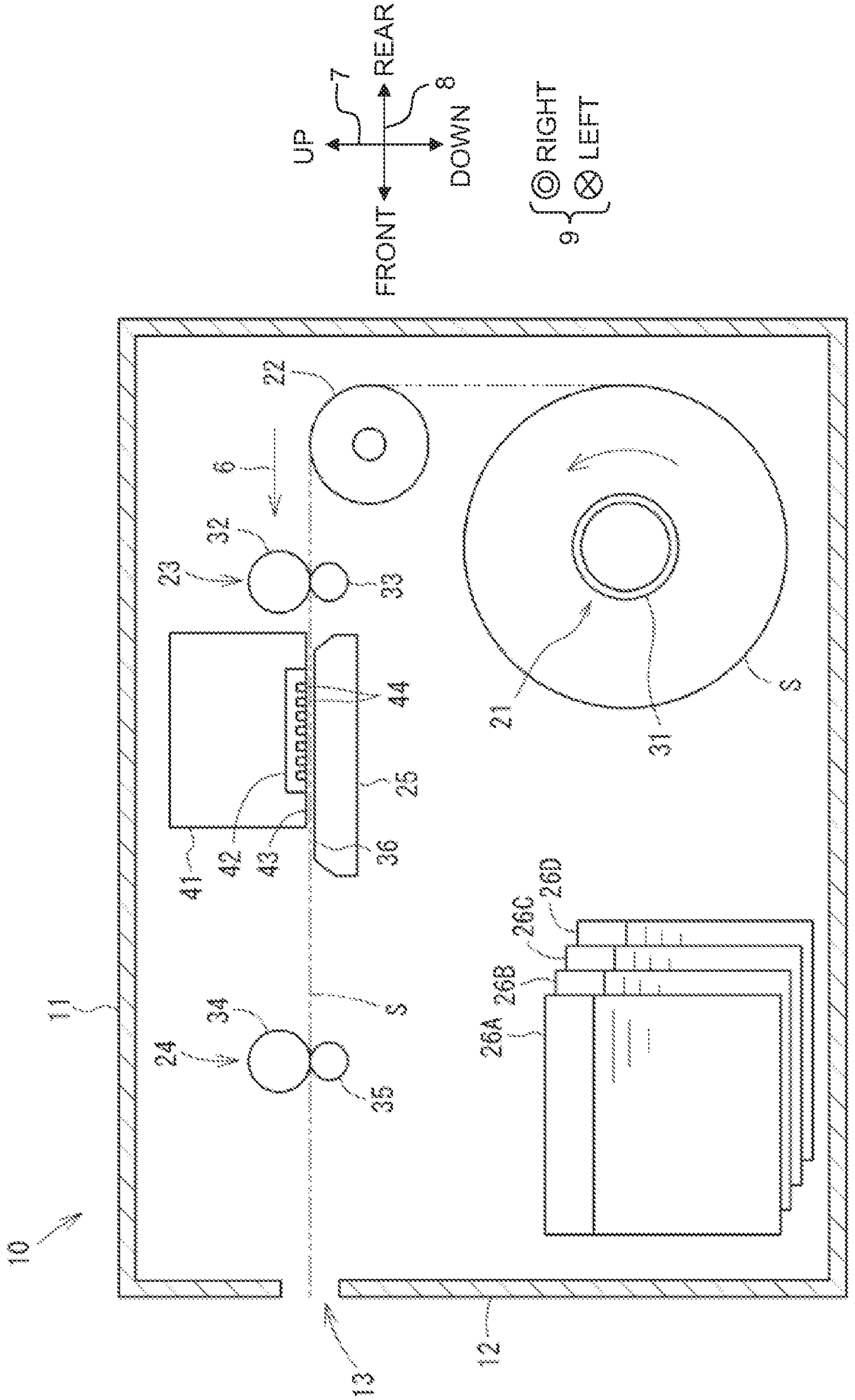
FIG. 1 is a schematic view depicting the internal configuration of a printer 10.

A maintenance apparatus 50 and a printer 10 (an example of an "image recording apparatus") according to an embodiment of the present disclosure will be explained below. It goes without saying that the embodiment described below is merely an example of the present disclosure and that the embodiment of the present disclosure can be changed as appropriate, in a range not changing the gist and spirit of the present disclosure. In the following explanation, advancement or movement (progress) directed from a starting point to an end point of an arrow is expressed as an "orientation", and going forth and back on a line connecting the starting point and the end point of the arrow is expressed as a "direction". Further, an up-down direction 7 is defined based on a state in which the printer 10 is installed usably (a state of FIG. 1); a front-rear direction 8 is defined while defining a side on which a discharge port 13 is provided as a front side (front surface); and a left-right direction 9 is defined while seeing the printer 10 from the front side (front surface). The up-down direction 7, the front-rear direction 8, and the left-right direction 9 are orthogonal to one another.

[Overall Configuration of Printer 10]

The printer 10 depicted in FIG. 1 is an image recording apparatus which records an image on a sheet S by the ink-jet recording system. The sheet S is a long sheet (paper sheet or paper) wound in a roll shape. In order to install the sheet S in the printer 10, a through hole is formed in the winding center of the sheet S. The recording medium (recording objective medium) may be sticker sheet, fanfold paper, cut paper, or fabric, etc.

The printer 10 is provided with a casing 11 having a shape which is substantially a rectangular parallelepiped. The casing 11 has a size which is placeable on a table or desk, on the floor, or on a rack, etc. A discharge port 13 having a slit shape and extending in the left-right direction 9 is positioned in a front wall 12 of the casing 11. From the discharge port 13, a sheet S on which an image is recorded by the printer 10 is discharged. The discharged sheet S is wound up, for example, by a winding device (not depicted in the drawings) attached to the printer 10.

Figure 2:
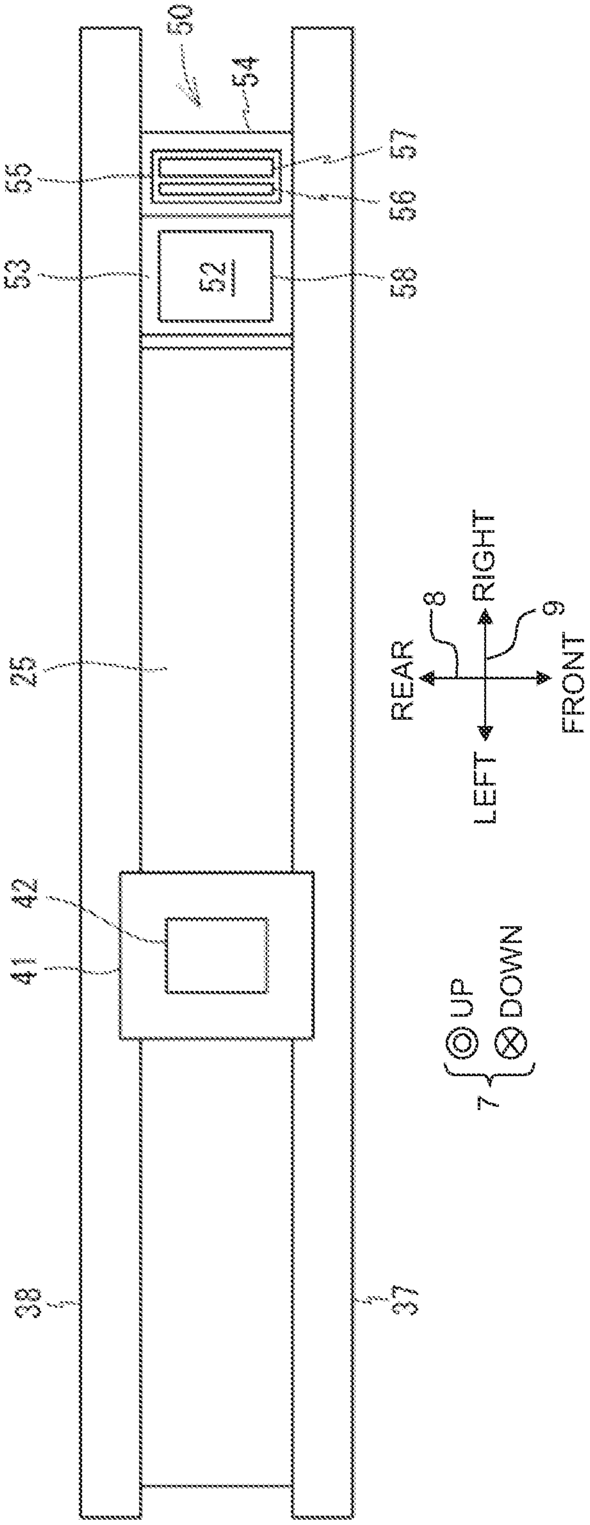
FIG. 2 is a view depicting a moving range of a carriage 41.

As depicted in FIG. 1, the printer 10 has, in the inside of the casing 11: a holder 21, a tensioner 22, a conveying roller pair 23, a discharging roller pair 24, a platen 25, four tanks 26A to 26D, a carriage 41 a and a head 42. The head 42 is mounted on the carriage 41. As depicted in FIG. 2, the printer 10 is further provided with, in the inside of the casing 11, two guide rails 37, 38 and a maintenance apparatus 50.

Figure 3:
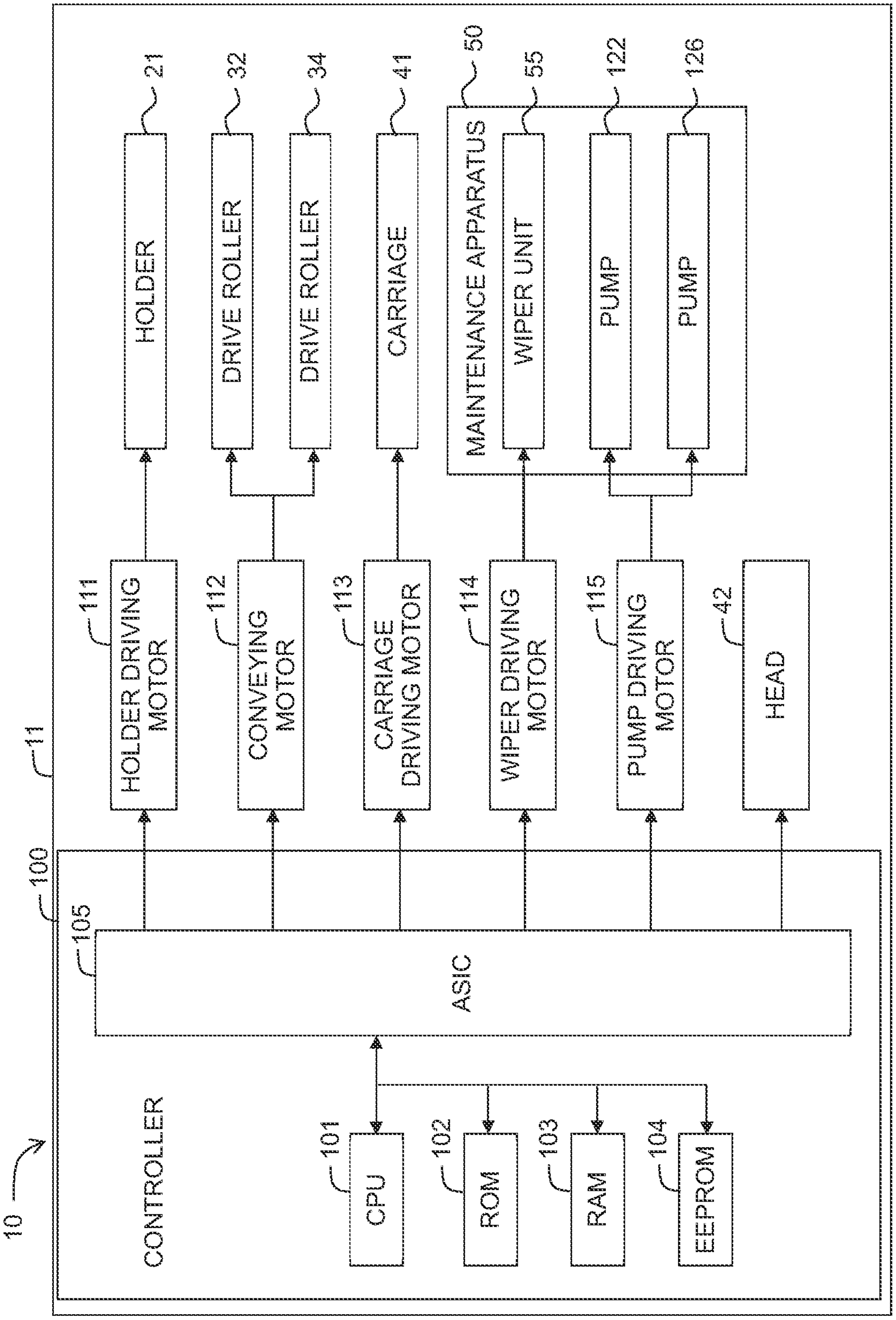
FIG. 3 is a block diagram depicting the configuration of a controller 100 and elements connected to the controller 100.

As depicted in FIG. 3, the printer 10 further has, within the casing 11, a controller 100, a holder driving motor 111, a conveying motor 112, a carriage driving motor 113, a wiper driving motor 114 and a pump driving motor 115. In addition to the above-described elements or components, the printer 10 may be further provided with a variety of kinds of sensors, a cap, etc.

[Tanks 26A to 26D]

The tanks 26A to 26D store yellow, magenta, cyan, and black inks (each of which is an example of a liquid), respectively. Each of the inks is a so-called latex ink and contains a pigment, resin fine particles, and an additive. Each of the inks has a viscosity suitable for uniformly dispersing the pigment and the resin fine particles. The pigment is the color of each of the inks. The resin fine particles are used to adhere the pigment to the sheet S. For example, the resin is a synthetic resin of which temperature exceeds the glass transition temperature by being heated by a heater (not depicted in the drawings).

Note that it is sufficient that the printer 10 is provided with at least one tank. Further, the tank may store a liquid different from the ink. The Liquid stored in the tank includes, for example, a pre-treatment liquid (a pre-processing liquid). The pre-treatment liquid may include a cationic polymer, a polyvalent metal salt (e.g., a magnesium salt), etc. The pre-treatment liquid has a function of reducing any ink blurring (ink blotting) and/or any ink bleed-through (back-through), by causing a component in the ink to aggregate or precipitate. In some cases, the pre-treatment liquid also has a function of improving the color developing property and/or the quick-drying property of the ink.

[Conveyance Mechanism for Sheet S]

A pair of side frames (not depicted in the drawings) extending in the up-down direction 7 and the front-rear direction 8 are located in the inside of the casing 11. The holder 21 has a rotation shaft 31 which supports the sheet S. The rotation shaft 31 extends in the left-right direction 9 and both ends of the rotation shaft 31 are fixed to the side frames. The power from the holder driving motor 111 (see FIG. 3) is transmitted to the rotation shaft 31. This power causes the holder 21 to rotate in the circumferential direction of the rotation shaft 31. In FIG. 1, the direction of rotation of the holder 21 is counterclockwise. By the rotation of the holder 21, a roll body supported by the holder 21 also rotates. By the rotation of the conveying roller pair 23 and the discharging roller pair 24, the sheet S is drawn upwardly from a rear end of the roll body, and is guided to the tensioner 22.

The tensioner 22, the conveying roller pair 23 and the discharging roller pair 24 each extend in the left-right direction 9 between the side frames, and each are attached to be rotatable in the circumferential direction of a rotational axis parallel to the left-right direction 9. A rearward urging force is applied to the tensioner 22 by an urging member such as a spring, etc. The tensioner 22 makes contact with the sheet S drawn from the roll body and guides the sheet S to be curved forward.

The conveying roller pair 23 has a drive roller 32 and a pinch roller 33, and is positioned at a location in front of the tensioner 22. The discharging roller pair 24 has a drive roller 34 and a pinch roller 35 and is positioned at a location further in front of the conveying roller pair 23. The positions of lower ends, respectively, of the drive rollers 32 and 34 are substantially coincident with the position of an upper end of the tensioner 22 in the up-down direction 7. The pinch roller 33 makes contact with the drive roller 32 from a position below the drive roller 32. The pinch roller 35 makes contact with the drive roller 34 from a position below the drive roller 34.

The power from the conveying motor 112 (see FIG. 3) is transmitted to the drive rollers 32 and 34. This power causes the drive rollers 32, 34 to rotate. With this, the drive roller 32 conveys the sheet S in the conveyance orientation 6 while nipping the sheet S between the drive roller 32 and the pinch roller 33, and the drive roller 34 conveys the sheet S in the conveyance orientation 6 while nipping the sheet S between the drive roller 34 and the pinch roller 35. In this embodiment, the conveyance orientation 6 is frontward (frontward orientation).

[Platen 25]

The platen 25 is attached to the side frames at a location between the conveying roller pair 23 and the discharging roller pair 24 in the front-rear direction 8. The platen 25 extends in the left-right direction 9 between the side frames and has a support surface 36, for the sheet S, which spreads or extends in the front-rear direction 8 and the left-right direction 9. The support surface 36 is an upper end surface of the platen 25. An up-down position (position in the up-down direction 7) of the support surface 36 is substantially coincident with the position of the upper end of the tensioner 22. The platen 25 may be a suction platen which is configured to attract the sheet S, by suction, onto the support surface 36.

[Carriage 41 and Head 42]

As depicted in FIG. 2, the guide rails 37, 38 extend parallel to each other in the left-right direction 9. The positions in the up-down direction 7 of the guide rails 37 and 38 are same. The guide rail 38 is positioned behind the guide rail 37 in the front-rear direction 8. Both ends of each of the guide rails 37 and 38 are fixed to the side frames. The carriage 41 is supported by the guide rails 37 and 38. The power of the carriage driving motor 113 (see FIG. 3) is transmitted to a carriage driving mechanism (not depicted in the drawings). The carriage 41 is moved in the left-right direction 9 by the action of the carriage driving mechanism in a state that the carriage 41 is supported by the guide rails 37, 38.

As depicted in FIG. 1, the head 42 is mounted on the carriage 41. A lower surface of the head 42 is referred to as a nozzle surface 43. A plurality of nozzles 44 which are configured to discharge the inks are formed in the nozzle surface 43. The tanks 26A to 26D and the head 42 are connected via an ink channel (not depicted in the drawings). The inks stored, respectively, in the tanks 26A to 26D are supplied to the head 42 via the ink channel. While the carriage 41 is moving in the left-right direction 9, the ink(s) supplied to the head 42 is (are) discharged or ejected from the plurality of nozzles 44. With this, image recording is performed on the sheet S.

[Controller 100]

As depicted in FIG. 3, the controller 100 includes a CPU 101, a ROM 102, a RAM 103, an EEPROM 104 and an ASIC 105. The ROM 102 stores various kinds of data, etc., necessary for the operation of the controller 100. The RAM 103 is a working memory of the CPU 101. The EEPROM 104 stores a control program, etc., executed by the CPU 101. Before the printer 10 performs the image recording, the control program stored in the EEPROM 104 is copied to the RAM 103. The CPU 101 executes the control program stored in RAM 103. With this, the controller 100 executes an image recording processing which will be described later on.

The controller 100 is electrically connected, via the ASIC 105, to the holder driving motor 111, the conveying motor 112, the carriage driving motor 113, the wiper driving motor 114, the pump driving motor 115 and the head 42. Each of the holder driving motor 111, the conveying motor 112, the carriage driving motor 113, the wiper driving motor 114, the pump driving motor 115 rotates in accordance with the control from the controller 100, and generates the power (motive power). The head 42 discharges the ink(s) with respect to the sheet S which is being conveyed on the platen 25, in accordance with the control from the controller 100.

The holder 21 rotates by the power from the holder driving motor 111. The drive rollers 32 and 34 rotate by the power from the conveying motor 112. The sheet S is conveyed in the conveyance orientation 6 by the power from the conveying motor 112. The carriage 41 moves in the left-right direction 9 by the power from the carriage driving motor 113. A wiper unit 55 included in the maintenance apparatus 50 performs an operation which will be described later on by the power from the wiper driving motor 114. Pumps 122 and 126 included in the maintenance apparatus 50 perform an operation which will be described later on by the power from the pump driving motor 115. Note that some of the holder driving motor 111, the conveying motor 112, the carriage driving motor 113, the wiper driving motor 114 and the pump driving motor 115 may be realized by a common motor (one motor). Further, the motor driving the pump 122 and the motor driving the pump 126 may be separate motors.

[Moving Range of Carriage 41]

As depicted in FIG. 2, the platen 25 has a shape which is long in the left-right direction 9 and is located at a position which is below the carriage 41 in the up-down direction 7 (see FIG. 1). A left end of the platen 25 is positioned, in the left-right direction 9, in the vicinity of left ends of the guide rails 37 and 38. A right end of the platen 25 is positioned, in the left-right direction 9, at a location on the right side with respect to the centers in the left-right direction 9, respectively, of the guide rails 37, 38. The maintenance apparatus 50 is positioned, in the left-right direction 9, on the right side with respect to the platen 25. While the printer 10 is executing the image recording, the carriage 41 moves in the left-right direction 9 within a range of the platen 25. While the printer 10 is not executing the image recording, the carriage 41 is located at a position which is on the right side with respect to the maintenance apparatus 50 (hereinafter referred to as a "standby position").

[Maintenance Apparatus 50]

Figure 4:
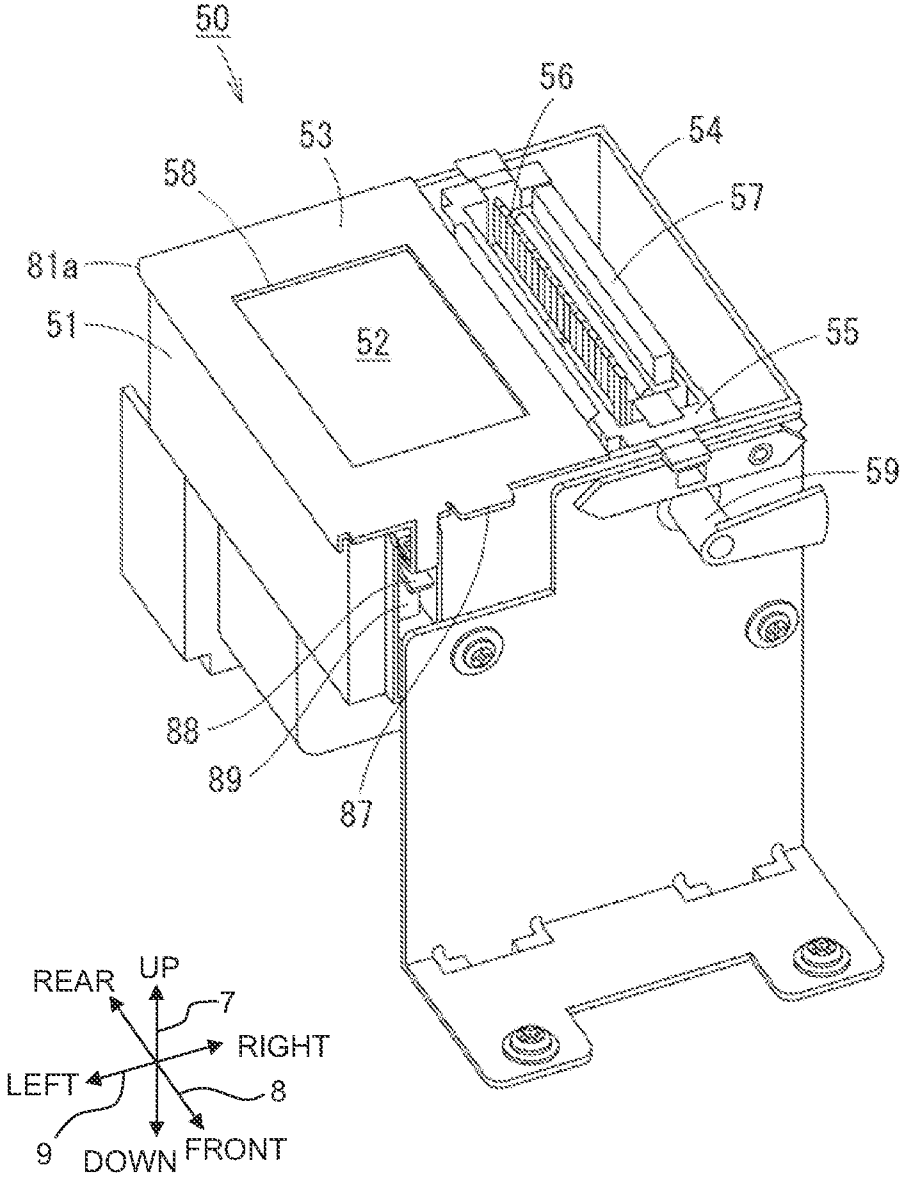
FIG. 4 is a perspective view depicting the outer appearance of a maintenance apparatus 50.
Figure 6A:
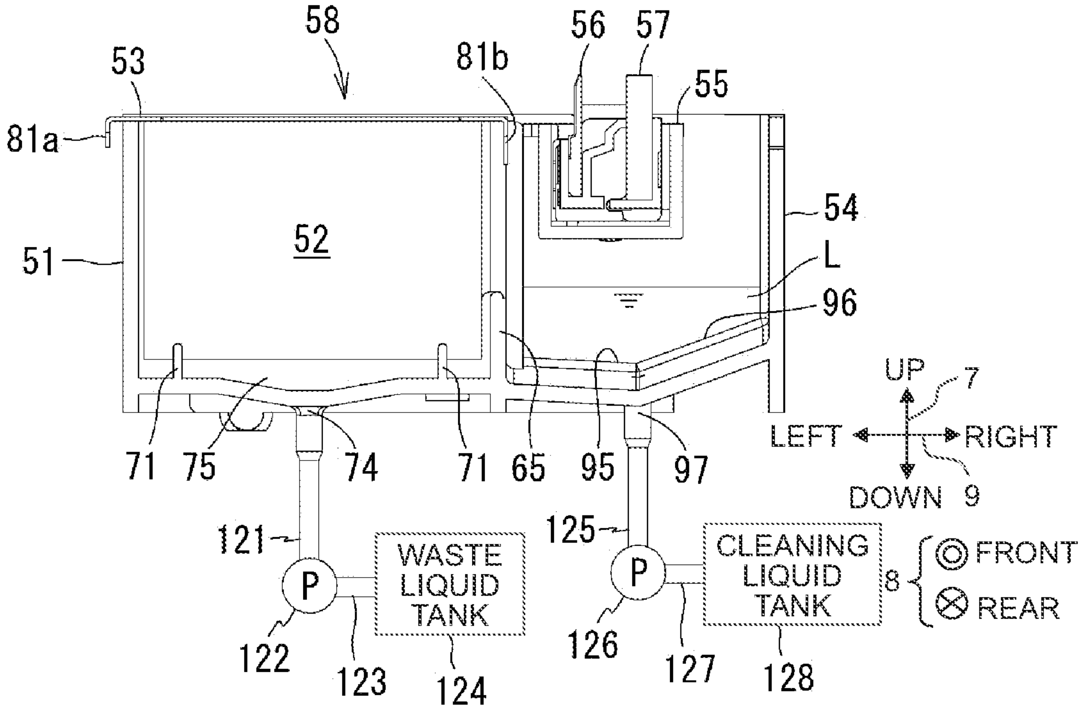
FIG. 6A is a cross-sectional view of the main part of the maintenance apparatus 50, taken along a A-A line of FIG. 5A.

As depicted in FIG. 4, the maintenance apparatus 50 is provided with a flushing box 51, a flushing foam 52, a plate member (plate) 53, a storage tank 54, the wiper unit 55, and two wipers 56 and 57. As depicted in FIG. 6A, the maintenance apparatus 50 is further provided with the pump 122, 126, a waste liquid tank 124 and a cleaning liquid tank 128. The flushing box 51, the flushing foam 52, the plate member 53, the pump 122 and the waste liquid tank 124 are elements or components for the flushing processing. The storage tank 54 (a part of the supplying part (the liquid supplier)), the wiper unit 55, the wipers 56, 57, the pump 126 (a part of the supplying part (the liquid supplier)), and the cleaning liquid tank 128 are elements for a wiping processing.

Figure 7:
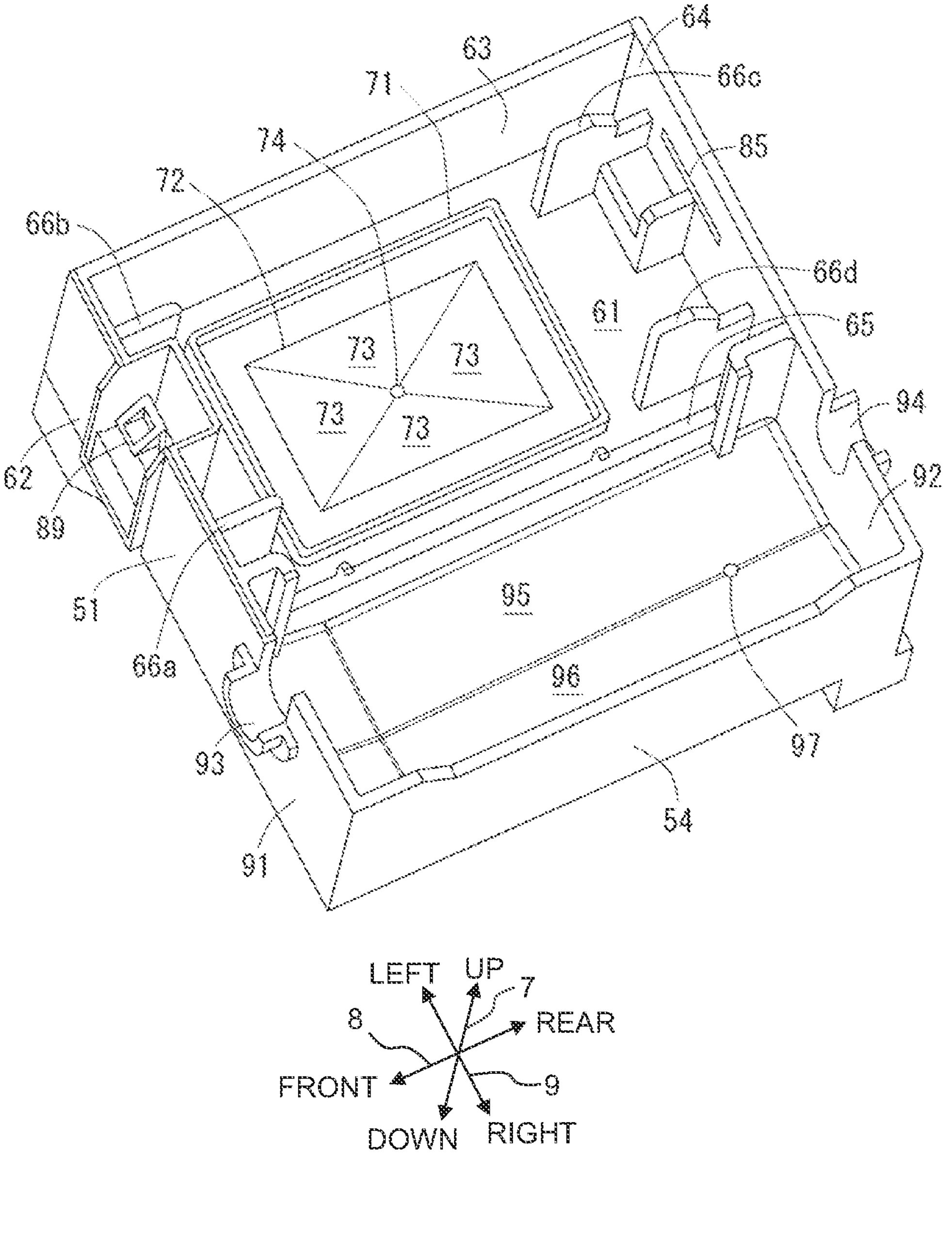
FIG. 7 is a perspective view depicting the inside of a flushing box 51 and the inside of a storage tank 54.

As depicted in FIGS. 4, 5A, 6A and 7, the storage tank 54 is adjacent to the flushing box 51 and is positioned on the right side with respect to the flushing box 51. The flushing box 51 and the storage tank 54 are integrally formed (formed as a single unit). FIG. 7 depicts the inside of each of the flushing box 51 and the storage tank 54 in a state that the flushing foam 52, the plate member 53, the wiper unit 55 and the wipers 56, 57 are detached (omitted in the illustration).

[Flushing Box 51]

As depicted in FIG. 7, the flushing box 51 has a box-like shape which does not have an upper surface. That is, the flushing box 51 is opened upwardly. As depicted in FIGS. 5B and 6A, the flushing box 51 is configured to accommodate or store the flushing foam 52 therein. The flushing foam 52 is formed of a porous material. The flushing foam 52 is, for example, a sponge. The flushing foam 52 is an example of a "foam". The flushing box 51 is an example of an "accommodating box".

Figure 5A:
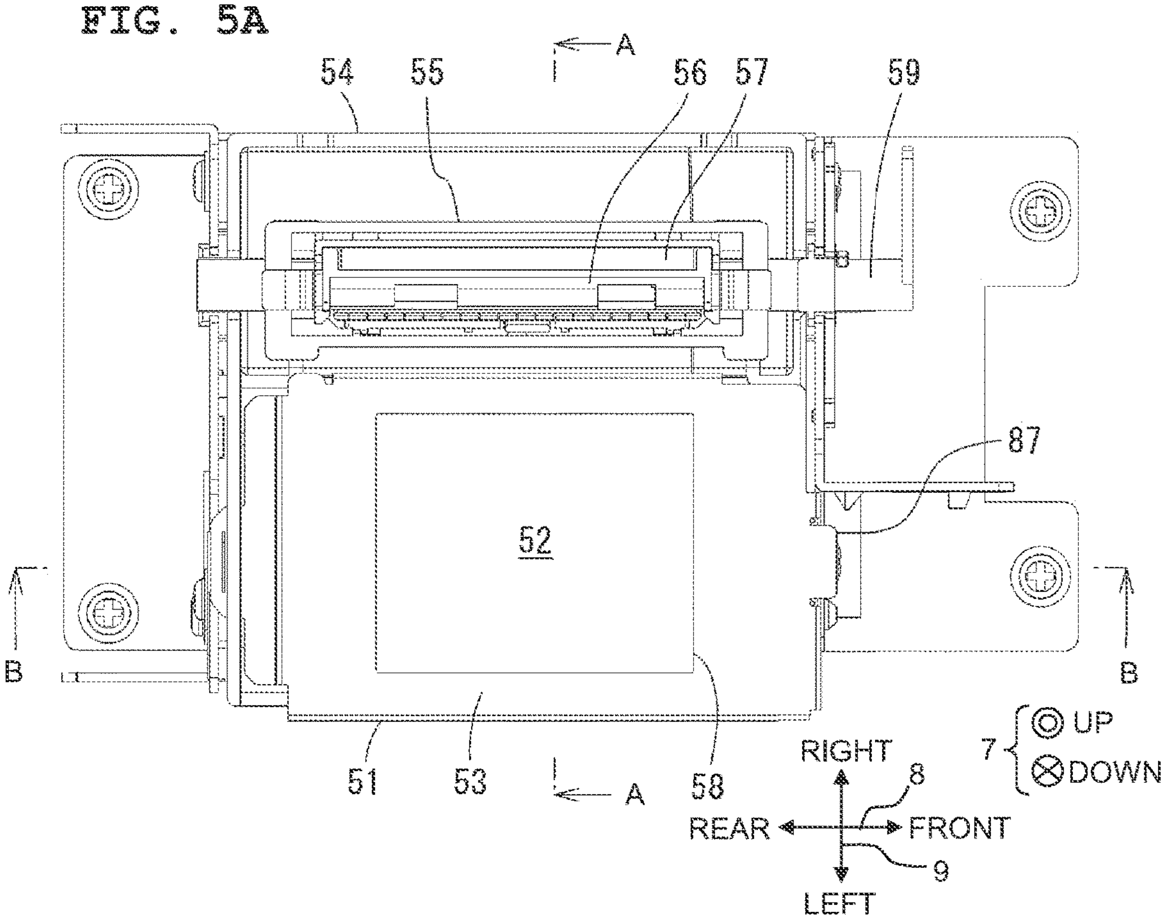
FIG. 5A is a top view of the maintenance apparatus 50.
Figure 5B:
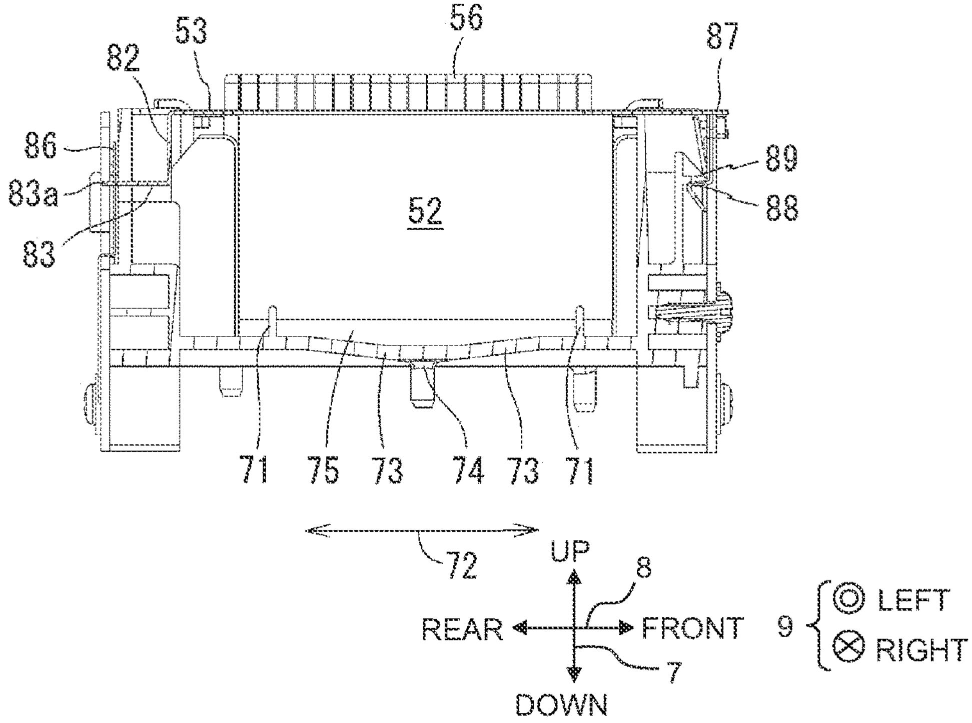
FIG. 5B is a cross-sectional view of a main part of the maintenance apparatus 50, taken along a B-B line of FIG. 5A.

As depicted in FIGS. 4 and 5A, the plate member 53 is configured to cover an upper part of the flashing box 51. The plate member 53 has an opening 58 which is located in a central part of the plate member 53 and which exposes a part of the upper surface of the flashing foam 52 in a state that the plate member 53 is locked to the flushing box 51. The plate member 53 covers the entirety of the upper part of the flushing box 51, except for the position at which the opening 58 is located. In the state that the plate member 53 is locked to the flushing box 51, the plate member 53 apply a downward force to the flushing foam 52 accommodated in the flushing box 51.

In a case that the controller 100 performs the flushing processing, the controller 100 moves the carriage 41 to a location above the flushing box 51. The opening 58 is formed so that all the plurality of nozzles 44 of the head 42 face the flushing foam 52 in a case that carriage 41 is positioned above the flushing box 51. The plate member 53 has an opening 58 corresponding to at least all of the plurality of nozzles 44 of the head 42. That is, the opening 58 of the plate member 53 may have such a shape and a size that, in a state that the head 42 and the flushing foam 52 face or opposed to each other, all of the plurality of nozzles 44 of the head 42 is positioned inside the opening 58 as seen in the up-down direction 7 in which the head 42 and the flushing foam 52 face or opposed to each other. It is desired that the shape of the opening 58 is same as the shape of an arrangement area in which the plurality of nozzles 44 are arranged in the head 42. Here, the shape of the arrangement area of the plurality of nozzles 44 may be defined by a profile or an outline obtained by connecting outermost nozzles 44, for example. It is more desired that the size of the opening 58 is same as, or is slightly greater than, the size of the arrangement area of the plurality of nozzles 44 in the head 42. The flushing foam 52 accommodated in the flushing box 51 is used to absorb the ink(s) discharged from the plurality of nozzles 44 of the head 42 by the flushing processing.

As depicted in FIG. 7, the flushing box 51 has a lower wall 61, a front wall 62, a left wall 63, a rear wall 64, and a partition 65. In a case that such a situation is considered the partition 65 is extended upward so as to be a virtual right wall facing the left wall 63, the lower wall 61, the front wall 62, the left wall 63, the rear wall 64 and the virtual right wall partition or define the internal space of the flushing box 51.

The front wall 62 has two ribs 66*a*, 66*b* protruding towards the internal space of the flushing box 51. The rear wall 64 has two ribs 66*c* and 66*d* protruding towards the internal space of the flushing box 51. The bottom surface of each of the ribs 66*a* to 66*d* is fixed to an inner surface of the lower wall 61 (a surface, of the lower wall 61, on the side of the internal space of the flushing box 51).

A rib 71 being annular (annular rib) protruding towards the internal space of the flushing box 51 is located at a central part of the inner surface of the lower wall 61. The planar shape of the rib 71 is substantially rectangular. In a case that the flushing foam 52 is placed in the flushing box 51 in a state that the plate member 53 does not cover the upper part of the flushing box 51, a bottom surface of the flushing foam 52 makes contact with an upper surface of the rib 71 without being deformed. Afterwards, in a case that the plate member 53 covers the upper part of the flushing box 51, a part, of the bottom surface of the flushing foam 52 accommodated in the flushing box 51, which makes contact with the upper surface of the rib 71 is deformed, and a part of the rib 71 bites into the flushing foam 52. In this state, the rib 71 supports the bottom surface of the flushing foam 52. In such a manner, an inner bottom surface of the flushing box 51 has the rib 71 which supports the bottom surface of the flushing foam 52, while deforming the part of the bottom surface of the flushing foam 52.

A recessed part 72 is positioned in a part, in the inner surface of the lower wall 61, which is surrounded by the rib 71. The recessed part 72 is a part which is further away outwardly from the internal space of the flushing box 51 as closer to the center of the recessed part 72, and which is formed by four triangular-shaped inclined surfaces 73. An exhaust port 74 is positioned at the center of the recessed part 72. In such a manner, the inner bottom surface of the flushing box 51 has the recessed part 72 which is recessed in an orientation of enlarging or expanding the internal space of the flushing box 51.

[Space 75 and Pump 122]

As depicted in FIGS. 5B and 6A, a space 75 is defined by the bottom surface of the flushing foam 52, the side surface at the inside of the rib 71 and the part, of the inner surface of the lower wall 61 of the flushing box 51, which is surrounded by the rib 71 (including the four inclined walls 73). In a case that the flushing foam 52 is considered as one solid body, the space 75 is an enclosed (sealed) space.

As depicted in FIG. 6A, the space 75 is connected to one end of the pump 122 via the exhaust port 74 and a tube 121. The other end of the pump 122 is connected to one end of the tube 123, and the waste liquid tank 124 is positioned at the other end of the tube 123. In a case that the pump 122 is driven by the pump driving motor 115 (see FIG. 3), the pump 122 imparts a negative pressure to the space 75.

[Plate Member 53]

The plate member (plate-like member, plate) 53 is a member obtained by forming the openings 58 in a plate made of a metal (hereinafter referred to as a "metal plate") and by machining the respective ends of the metal plate. As depicted in FIG. 6A, a vertical part 81*a* is formed at a left end of the plate member 53 and a vertical part 81*b* is formed at a right end of the plate member 53. The vertical part 81*a* is formed by bending an end (a part which becomes to be a left end), of the metal plate, so that the end is orthogonal to an upper surface of the plate member 53. The vertical part 81*b* is formed by bending a facing end (a part which becomes to be a right end) which faces the end, of the metal plate, so that the facing end is orthogonal to the upper surface of the plate member 53. The vertical parts 81*a* and 81*b* are formed so that in a case that the plate member 53 is locked to the flushing box 51, the vertical parts 81*a* and 81*b* reduce deviating of the plate member 53 in the left-right direction 9.

As depicted in FIG. 5B, a vertical part 82 and a horizontal part 83 are formed in a rear end of the plate member 53. The vertical part 82 is formed by bending another end of the metal sheet (a part which becomes the rear end of the plate member 53) so that the another end is orthogonal to the upper surface of the plate member 53. The horizontal part 83 is formed by bending the bent part of the metal sheet further outwardly (in a direction separated from the center of the plate 53) so that the further bent part is parallel to the upper surface of the plate 53.

Figure 6B:
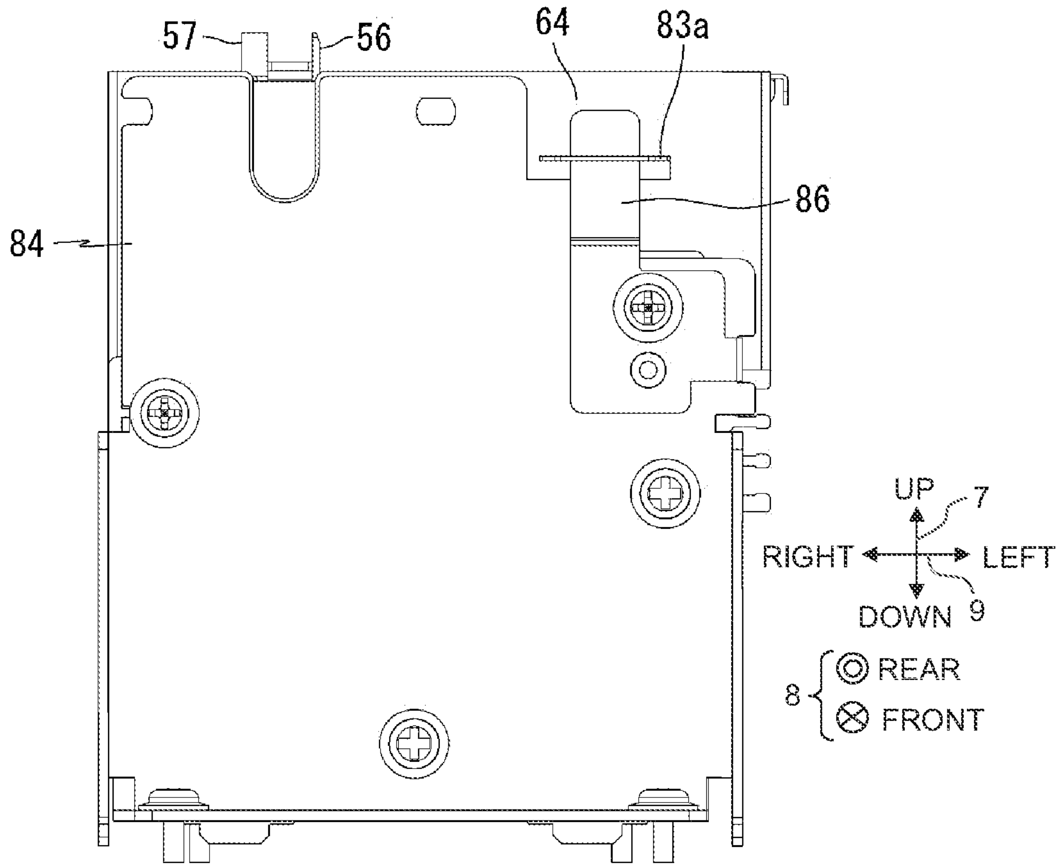
FIG. 6B is a rear side view of the maintenance apparatus 50.

As depicted in FIG. 6B, the rear wall 64 of the flushing box 51 is fixed to a casing 84 of the maintenance apparatus 50. As depicted in FIG. 7, the rear wall 64 of the flushing box 51 has an opening 85 which is configured to allow a forward end part 83*a* of the horizontal part 83 of the plate member 53 to pass therethrough. The forward end part 83*a* of the horizontal part 83 is inserted into the opening 85. The forward end part 83*a* of the horizontal part 83 has an opening (not depicted in the drawings) configured to allow an upper part of a plate spring 86 to pass therethrough. The upper part of the plate spring 86 is inserted into the opening of the forward end part 83*a* of the horizontal part 83. As depicted in FIG. 6B, a lower part of the plate spring 86 is fixed to the casing 84 of the maintenance apparatus 50. The upper part of the plate spring 86 urges the forward end part 83*a* in an orientation away from the rear wall 64 of the flushing box 51. In such a manner, the rear end of the plate member 53 is fixed to the flushing box 51 via the plate spring 86. The plate spring 86 urges the plate member 53 in an orientation away from the upper part of the flushing box 51. The rear end of the plate member 53 is an example of a "first end" of the plate member 53.

As depicted in FIGS. 5A and 5B, an operating part 87 and a hook 88 (a part of a hook structure) are formed in a front end of the plate member 53. The operating part 87 is a part of which width is narrower than that of the front end of the plate member 53. The operating part 87 has a width suitable for a user of the printer 10 to lift the operating part 87 upwardly with a finger of the user. The hook 88 is formed by bending a metal plate of which width is narrower than that of the metal plate forming the plate member 53 in a direction of 90° and in a direction of 60°. The hook 88 is fixed to the front end of the plate member 53.

As depicted in FIG. 7, a hook receiving part 89 (a part of a hook structure) is located at the outside of the front wall 62 of the flushing box 51. The position of the hook receiving part 89 is a position which is close to the hook 88 in a case that the plate member 53 covers the upper part of the flushing box 51. In a case that the plate member 53 covers the upper part of the flushing box 51, the hook 88 engages with the hook receiving part 89 and the plate member 53 is locked to the flushing box 51. In such a manner, the front end of the plate member 53 is locked to the flushing box 51 via the hook structure. The front end of the plate member 53 is an example of a "second end", of the plate member 53, which faces the rear end of the plate member 53.

In a case that the flushing processing is performed repeatedly, there arises a need to exchange the flushing foam 52. In a case that the user of the printer 10 exchanges the flushing foam 52, the user lifts the operating part 87 upwardly until the hook 88 is detached from the hook receiving part 89. In a case that the hook 88 is detached from the hook receiving part 89, the plate member 53 rotates with the rear end side thereof as the center of rotation due to the urging force of the plate spring 86, and is away from the upper part of the flushing box 51. In this situation, the plate member 53 is away from the upper part of the flushing box 51 so that an angle defined between the plate member 53 and the upper part (or a plane within which the upper end of the flushing box 51 extends) of the flushing member 53 is within a range of approximately 10° to approximately 45°.

[Storage Tank 54 and Wiper Unit 55]

As depicted in FIG. 7 the storage tank 54 has a box-like shape which does not have an upper part. As depicted in FIG. 6A, the storage tank 54 stores a cleaning liquid L in the inside thereof. The cleaning liquid L is a liquid suitable for removing any unwanted substance (unnecessary matter) adhered to the nozzle surface 43 of the head 42. As the cleaning liquid L, for example, glycerin is used.

The wipers 56 and 57 are attached to the wiper unit 55 so that forward end parts, respectively, of the wipers 56 and 57 are located at the outside of the storage tank 54. The wiper 56 is not impregnated with the cleaning liquid L and deforms in response to an external force while maintaining the shape of the wiper 56 to some extent. On the other hand, the wiper 57 is impregnated with the cleaning liquid L and deforms, with a high degree of freedom, in response to the external force. The wiper 56 is formed, for example, of a rubber material. The wiper 57 is formed, for example, of a porous material.

As depicted in FIG. 4, the wiper unit 55 has a rotation shaft 59. As depicted in FIG. 7, the front wall 91 of the storage tank 54 has a support part 93 and the rear wall 92 of the storage tank 54 has a support part 94. The support part 93 is configured to support one end of the rotation shaft 59 of the wiper unit 55, and the support part 94 is configured to support the other end of the rotation shaft 59. With this, the wiper unit 55 is supported by the storage tank 54 so that the wiper unit 55 is rotatable with the rotation shaft 59 as the center of the rotation.

The power of the wiper driving motor 114 (see FIG. 3) is transmitted to a wiper driving mechanism (not depicted in the drawings), thereby causing the rotation shaft 59 of the wiper unit 55 to make a half rotation; accompanying with this, the wiper unit 55 and the wipers 56, 57 make a half rotation with the rotation shaft 59 as the center of the half rotation. With this, the wiper unit 55 is moved between a position at which the forward end parts of the wipers 56 and 57 are oriented upward (a position depicted in FIG. 6A; hereinafter referred to as an "upward position") and a position at which the forward end parts of the wipers 56 and 57 are oriented downward (not depicted in the drawings; hereinafter referred to as a "downward position").

In a case that the wiper unit 55 is located at the upward position, the wipers 56 and 57 are not immersed in the cleaning liquid L stored the storage tank 54, and are located at a position at which the wipers 56 and 57 are capable of making contact with the nozzle surface 43 of the head 42. In a case that the wiper unit 55 is located at the downward position, a part of the wiper 56 and a part of the wiper 57 are immersed in the cleaning liquid L stored in the storage tank 54, and the wipers 56 and 57 are located at a position at which the wipers 56 and 57 are not capable of making contact with the nozzle surface 43.

[Supplying Part of Cleaning Liquid L]

As depicted in FIGS. 6A and 7, a lower wall of the storage tank 54 is constructed of two inclined walls 95 and 96. The inclined wall 95 extends in the front-rear direction 8 and is positioned on the right side with respect to the flushing box 51. The inclined wall 96 extends in the front-rear direction 8 and is positioned further on the right side with respect to the inclined wall 95. A right end of the inclined wall 95 and a left end of the inclined wall 96 are at a same height and are connected to each other so that the cleaning liquid L does not leak. A left end of the inclined wall 95 is located at a position slightly higher than a position of the right end of the inclined wall 95. A right end of the inclined wall 96 is located at a position higher than a position of the left end of the inclined wall 96. A supply port 97 of the cleaning liquid L is located at a position, in a connection part at which the inclined walls 95 and 96 are connected to each other, which is close to the rear wall 92.

As depicted in FIG. 6A, the supply port 97 is connected to one end of the pump 126 via a tube 125. The other end of the pump 126 is connected to the cleaning liquid tank 128 via a tube 127. The cleaning liquid tank 128 stores an unused cleaning liquid. In a case that the pump 126 is driven by the pump driving motor 115 (see FIG. 3), the pump 126 supplies the unused cleaning liquid stored in the cleaning liquid tank 128 to the storage tank 54. The cleaning liquid L stored in the storage tank 54 is supplied from the cleaning liquid tank 128 to the storage tank 54 by using the pump 126. The storage tank 54 and the pump 126 are an example of a supplying part (liquid supplier) configured to supply the cleaning liquid to the flushing box 51.

As depicted in FIGS. 6A and 7, the flushing box 51 and the storage tank 54 are partitioned from each other by the partition 65. The partition 65 is lower than the front wall 62, the left wall 63 and the rear wall 64. In a case that the pump 126 is operated and that the cleaning liquid is supplied from the cleaning liquid tank 128 to the storage tank 54, a part of the cleaning liquid L stored in the storage tank 54 flows over the partition 65 and flows into the inside of the flushing box 51. The cleaning liquid L flowed into the inside of the flushing box 51 flows through the space at the outside of the rib 71 and surrounds the outer side of the rib 71. The cleaning fluid L located at the outside of the rib 71 is absorbed by the flushing foam 52 and diffuses in the inside of the flushing foam 52.

[Image Recording Processing]

Figure 8:
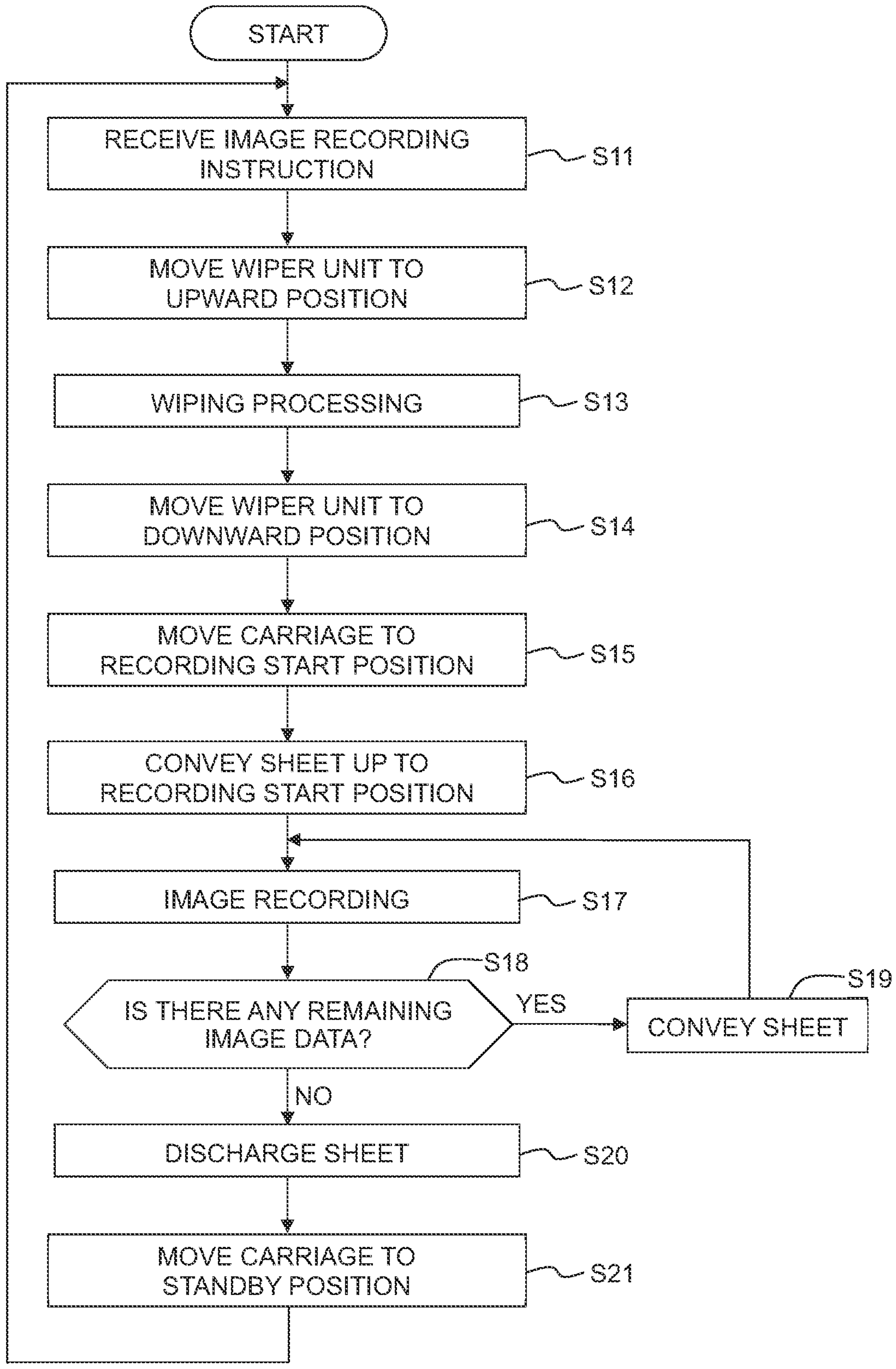
FIG. 8 is a flowchart indicating an image recording processing of the controller 100.

With reference to FIG. 8, an image recording processing by the controller 100 will be explained. At a point of time that the controller 100 reaches step S11, the carriage 41 is located at the standby position and the wiper unit 55 is located at the downward position. At this time, the part of the wiper 56 and the part of the wiper 57 are immersed in the cleaning liquid L stored in the storage tank 54.

The controller 100 receives an image recording instruction from an operation part (not depicted in the drawings) (step S11). Specifically, the controller 100 stands by in step S11 until the controller 100 receives the image recording instruction. In a case that the controller 100 receives the image recording instruction in step S11, the controller 100 controls the wiper driving motor 114 to thereby move the wiper unit 55 to the upward position (step S12).

Next, the controller 100 executes a wiping processing (step S13). In step S13, the controller 100 controls the carriage driving motor 113 to thereby cause the carriage 41 to move in the leftward orientation from the standby position to a position above the wiper unit 55. In this situation, the carriage 41 moves in the leftward orientation while the wipers 56 and 57 are making contact with the nozzle surface 43 of the head 42. The controller 100 controls the carriage driving motor 113 to thereby cause the carriage 41 to move to a position at which the wipers 56 and 57 do not make contact with the nozzle surface 43 of the head 42. At this point of time, the controller 100 ends the wiping processing. Next, the controller 100 controls the wiper driving motor 114 to thereby cause the wiper unit 55 to move to the downward position (step S14).

Next, the controller 100 controls the carriage driving motor 113 to thereby move the carriage 41 in the leftward orientation to a recording start position (step S15). The recording start position is a predetermined position at which the carriage 41 faces the platen 25. Next, the controller 100 controls the holder driving motor 111 and the conveying motor 112 to thereby convey the sheet S to the recording start position (step S16). Note that the controller 100 may execute step S16 in parallel to all or a part of steps S12 to S15.

Next, the controller 100 executes image recording on the sheet S (step S17). In step S17, the controller 100 controls the carriage driving motor 113 to thereby move the carriage 41 in the left-right direction 9 (to move leftward or rightward orientation). The controller 100 controls the head 42 while the carriage 41 is moving in the left-right direction 9, the controller 100 thereby causes the plurality of nozzles 44 of the head 42 to discharge the ink(s) in an amount corresponding to image data.

Next, the controller 100 determines whether there is any remaining image data (step S18). In accordance with the determination made by the controller 100 that there is the remaining image data in step S18 (step S18: YES), the controller 100 proceeds to step S19. In this case, the controller 100 controls the conveying motor 112 to thereby convey the sheet S by a predetermined amount (step S19). Then, the controller 100 proceeds to step S17.

In accordance with the determination made by the controller 100 that there is not any remaining image data in step S18 (step S18: NO), the controller 100 proceeds to step S20. In this case, the controller 100 controls the conveying motor 112 to thereby discharge the sheet S up to a predetermined position (step S20). Next, the controller 100 controls the carriage driving motor 113 to thereby move the carriage 41 in the rightward orientation up to the standby position (step S21). Then, the controller 100 proceeds to step S11 so as to execute a next image recording.

[Flushing Processing]

In a case, for example, that an elapsed time which has elapsed since the flushing processing executed the last time exceeds a threshold value or in a case that the controller 100 receives an instruction from the user of the printer 10, the controller 100 determines that the flushing processing needs to be performed. The controller 100 performs the flushing processing in accordance with the determination made by the controller 100 that the flushing processing needs to be performed.

As described above, in a case that the controller 100 performs the flushing processing, the controller 100 controls the carriage driving motor 113 to thereby cause the carriage 41 to move to the location above flushing box 51. The opening 58 is formed such that, in a case that the carriage 41 is positioned above the flushing box 51, all of the plurality of nozzles 44 of the head 42 face the flushing foam 52 via the opening 58, that is all of the plurality of nozzles 44 of the head 42 is positioned inside the opening 58 as seen in the up-down direction 7. The controller 100 performs a control of causing the head 42 to discharge the ink(s) in an amount, which is suitable for the flushing processing, from the plurality of nozzles 44. The flushing foam 52 accommodated in the flushing box 51 absorbs the ink(s) discharged from the plurality of nozzles 44 of the head 42 by the flushing processing.

Since the flushing foam 52 is impregnated with the cleaning liquid L, the ink(s) absorbed by the flushing foam 52 moves downwardly, together with the cleaning liquid L, in the inside of the flushing foam 52, and reaches the space 75 defined at the location below the bottom surface of the flushing foam 52.

The controller 100 drives the pump driving motor 115 (see FIG. 3) while performing the flushing processing or after performing the flushing processing to thereby operate or drive the pump 122. The pump 122 applies a negative pressure to the space 75. Accordingly, the ink and the cleaning liquid L in the inside of the flushing foam 52 are sucked and move quickly downward, and the ink and the cleaning liquid L which have reached the space 75 are sucked and moved to the waste liquid tank 124.

Effects of the Embodiments

As described above, the maintenance apparatus 50 according to the present embodiment includes: the flushing foam 52 configured to absorb the ink(s) discharged from the plurality of nozzles 44 of the head 42; the flushing box 51 which does not have any upper surface (that is, opened upwardly) and which is configured to accommodate the flushing foam 52, and the plate member 53 configured to cover the upper part of the flushing foam 52. The plate member 53 has the opening 58 configured to expose the part of the upper surface of the flushing foam 52 in the state that the plate member 53 is locked to the flushing box 51.

According to the maintenance apparatus 50 according to the present embodiment, the plate member 53 having the opening 58 is used so as to cover the upper part of the flushing box 51, thereby making it possible to press the flushing foam 52 downwardly while exposing the part of the upper surface of the flushing foam 52. Accordingly, it is possible to maintain the distance between the flushing foam 52 and the head 42 appropriately, and to effectively reduce any contact between the flushing foam 52 and the nozzle surface 43 of the head 42. Also according to the printer 10 according the present embodiment, the similar effect can be obtained.

The printer 10 performs the image recording by using the latex ink. Accordingly, regarding the printer 10, any inconvenience that the ink adhered to the member covering the flushing box makes contact with the nozzle surface of the head is more likely to occur, as compared with a printer using a general ink. Even in such a case, it is possible to press the flushing foam 52 downwardly by the plate member 53, to maintain the distance between the flushing foam 52 and the head 42 appropriately, and to reduce any contact between the flushing foam 52 and the nozzle surface 43 of the head 42. The present disclosure is effective particularly regarding a case wherein the image recording is performed by using the latex ink(s).

Further, the plate member 53 has the opening corresponding at least all the plurality of nozzles 44 of the head 42. Accordingly, it is possible to absorb the inks discharged from all the plurality of nozzles 44 with the flushing foam 52, without allowing the inks to adhere to the plate member 53. Furthermore, the inner bottom surface of the flushing box 51 has the rib 71 which supports the bottom surface of the flushing foam 52 while deforming the part of the bottom surface of the flushing foam 52. Accordingly, it is possible to suppress any bulging or lifting of the upper surface of the flushing foam 52 which is pressed by the plate member 53.

Moreover, the inner bottom surface of the flushing box 51 has the recessed part 72 which is recessed in the orientation of enlarging the internal space of the flushing box 51. Accordingly, it is possible to collect the ink absorbed by the flushing foam 52 to the recessed part 72 of the flushing box 51. Further, in a case that the height of the rib 71 is not sufficient, it is possible to release the flushing foam 52 to the recessed part 72, and to flatten the upper surface of the flushing foam 52.

Furthermore, the rear end of the plate member 53 is fixed to the flushing box 51 via the plate spring 86, the front end of the plate member 53 is locked to the flushing box 51 via the hook structure having the hook 88 and the hook receiving part 89, and the plate spring 86 urges the plate member 53 in the orientation away from the upper part of the flushing box 51. Accordingly, by hooking (engaging) the hook 88 with respect to the hook receiving part 89, it is possible to lock the plate member 53 to the flushing box 51. In a case that the hook 88 is disengaged (is away) from the hook receiving part 89, the action of the plate spring 86 causes the plate member 53 to rotate with the rear end side of the plate member 53 as the center of rotation, and is detached from the upper part of the flushing box 51. Accordingly, it is possible to reduce such a situation that the user of the printer 10 fails to lock the plate member 53 to the flushing box 51 at a time of exchanging the flushing foam 52.

Moreover, the maintenance apparatus 50 has the supplying part configured to supply the cleaning liquid to the flushing box 51. Accordingly, the cleaning liquid supplied from the supplying part is stored in the flushing box 51, and the flushing foam 52 accommodated in the flushing box 51 is impregnated with the cleaning liquid. Accordingly, by the action of the cleaning liquid with which the flushing foam 52 is impregnated, it is possible to suppress the occurrence of such a situation that the ink discharged from the plurality of nozzles 44 of the head 42 remains in the inside of the flushing foam 52.

Further, the plate member 53 covers the entirety of the upper part of the flushing box 51, except for the position at which the opening 58 is provided; the size of the opening 58 is substantially same as the size of the arrangement area of the plurality of nozzles 44 in the head 42. Accordingly, it is possible to suppress evaporation of the cleaning liquid stored in the flushing box 51, while absorbing, with the flushing foam 52, the ink(s) discharged from the plurality of nozzles 44 of the head 42 by the flushing processing, without allowing the ink(s) discharged from the plurality of nozzles 44 to adhere to the plate member 53.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modifications

Various modifications can be configured for the maintenance apparatus 50 according to the present embodiment. In the maintenance apparatus 50, the plate member 53 is configured to have the opening 58 corresponding at least to all the plurality of nozzles 44 of the head 42. Regarding the maintenance apparatus according to a modification, the head 42 may have, in the nozzle surface 43, not less than one piece of a nozzle row in which a plurality of nozzles 44 are aligned in the front-rear direction 8 or the left-right direction 9, and the plate member 53 may have an opening corresponding to the at least one piece of the nozzle row of the head 42. That is, the opening 58 of the plate member 53 may have such a shape and a size that, in a state that the head 42 and the flushing foam 52 face or opposed to each other, all of the plurality of nozzles 44 of at least one nozzle row of the head 42 is positioned inside the opening 58 as seen in the up-down direction 7 in which the head 42 and the flushing foam 52 face or opposed to each other. In such a case, the controller 100 performs the flushing processing while moving the carriage 41. According to the maintenance apparatus according to the modification, it is possible to absorb, with the flushing foam 52, the ink(s) discharged from the plurality of nozzles 44 within the nozzle row of the head 42, without allowing the ink(s) discharged from the plurality of nozzles 44 to adhere to the plate member 53.

In the maintenance apparatus 50, the plate member 53 is configured to press the flushing foam 52 downwardly so as to apply a downward force to the flushing foam 52. Regarding the maintenance apparatus according to a modification, the plate member 53 may be configured not to press the flushing foam 52. In such configuration(s), for example, the lower surface of the plate member 53 and the upper surface of the flushing foam 52 are positioned substantially the same position in the up-down direction 7 or positioned slightly distanced from each other in the up-down direction 7.

In the maintenance apparatus 50, the rib 71 is configured to be the annular rib. Regarding the maintenance apparatus according to a modification, it is not necessarily indispensable that the rib 71 is an annular rib. In the maintenance apparatus 50, the inner bottom surface of the flushing box 51 is configured to have the recessed part 72. Regarding the maintenance apparatus according to a modification, it is not necessarily indispensable that the inner bottom surface of the flushing box 51 is configured to have the recessed part 72.

In the maintenance apparatus 50, the rear end of the plate member 53 is configured to be fixed to the flushing box 51 via the plate spring 86, and the front end of the plate member 53 is configured to be locked to the flushing box 51 via the hook structure. Regarding the maintenance apparatus according to a modification, the plate member 53 may be locked to the flushing box 51 by a method which is different from that described above. For example, the front end and the rear end of the plate member 53 may be locked to the flushing box 51 via a hook structure. Alternatively, the four ends of the plate member 53 may all be locked to the flushing box 51. Still alternatively, not less than one end of the plate member 53 may be locked to the flushing box 51 by a means different from the hook structure.

In the maintenance apparatus 50, the flushing box 51 and the storage tank 54 are integrally formed. In the maintenance apparatus according to a modification, the flushing box 51 and the storage tank 54 may be formed separately. The maintenance apparatus according to a modification may not have the elements for the wiping processing (the storage tank 54, the wiper unit 55, and the wipers 56, 57). In this case, the maintenance apparatus according to the modification may have a supplying part configured to supply the cleaning liquid to the flushing box 51, not via the storage tank 54.

What is claimed is:

1. A maintenance apparatus for an image recording apparatus provided with a head having a nozzle configured to discharge a liquid, the maintenance apparatus comprising:
- a foam configured to absorb the liquid discharged from the nozzle;
- an accommodating box which is opened upwardly and which accommodates the foam;
- a plate configured to cover an upper part of the accommodating box; and
- a storage tank configured to store a cleaning liquid; wherein:
- the plate has an opening configured to expose a part of an upper surface of the foam in a state that the plate is locked to the accommodating box;
- the accommodating box and the storage tank are fluidly connected to each other such that the cleaning liquid is allowed to flow from the storage tank into the accommodating box so as to reach the foam, and
- wherein the storage tank supports a wiper.

2. The maintenance apparatus according to claim 1, wherein the opening of the plate corresponds at least to one nozzle row of the head.

3. The maintenance apparatus according to claim 1, wherein the opening of the plate corresponds at least to all of the nozzle of the head.

4. The maintenance apparatus according to claim 1, wherein an inner bottom surface of the accommodating box has a rib configured to support a bottom surface of the foam.

5. The maintenance apparatus according to claim 1, wherein an inner bottom surface of the accommodating box has a recess which is recessed in an orientation of enlarging an internal space of the accommodating box.

6. The maintenance apparatus according to claim 1, further comprising a liquid supplier configured to supply the cleaning liquid to the accommodating box.

7. The maintenance apparatus according to claim 1, wherein the plate is configured to apply a downward force to the foam in the state that the plate is locked to the accommodating box.

8. The maintenance apparatus according to claim 1, wherein the plate is made of a metal.

9. The maintenance apparatus according to claim 1, wherein the opening of the plate has such a shape and a size that, in a state that the head and the foam are opposed to each other, all the nozzle of at least one nozzle row of the head is positioned inside the opening as seen in a direction in which the head and the foam are opposed to each other.

10. The maintenance apparatus according to claim 1, wherein the opening of the plate has such a shape and a size that, in a state that the head and the foam are opposed to each other, all the nozzle of the head is positioned inside the opening as seen in a direction in which the head and the foam are opposed to each other.

11. An image recording apparatus comprising:
- a head having a nozzle configured to discharge a liquid;
- a carriage configured to move in a state that the head is mounted on the carriage; and
- the maintenance apparatus as defined in claim 1.

12. The maintenance apparatus according to claim 1,
- wherein a first end of the plate is fixed to the accommodating box via a plate spring;
- a second end, of the plate, facing the first end is locked to the accommodating box via a hook structure; and
- the plate spring is configured to urge the plate in an orientation away from the upper part of the accommodating box.

13. The maintenance apparatus according to claim 1, wherein:
- the accommodating box and the storage tank are adjacent to each other; and
- the accommodating box and the storage tank are partitioned from each other by a partition.

14. The maintenance apparatus according to claim 13, wherein an upper end of the partition is positioned between an upper end of the foam and a lower end of the foam.

15. The maintenance apparatus according to claim 1, wherein the wiper is supported by the storage tank in a state that the wiper is movable between a position at which a forward end of the wiper is oriented upward and a position at which the forward end of the wiper is oriented downward.

16. A maintenance apparatus for an image recording apparatus provided with a head having a nozzle configured to discharge a liquid, the maintenance apparatus comprising:

a foam configured to absorb the liquid discharged from the nozzle;

an accommodating box which is opened upwardly and which accommodates the foam; and a plate configured to cover an upper part of the accommodating box, wherein the plate has an opening configured to expose a part of an upper surface of the foam in a state that the plate is locked to the accommodating box, wherein a first end of the plate is fixed to the accommodating box via a plate spring;

a second end, of the plate, facing the first end is locked to the accommodating box via a hook structure; and the plate spring is configured to urge the plate in an orientation away from the upper part of the accommodating box.

17. A maintenance apparatus for an image recording apparatus provided with a head having a nozzle configured to discharge a liquid, the maintenance apparatus comprising:

a foam configured to absorb the liquid discharged from the nozzle;

an accommodating box which is opened upwardly and which accommodates the foam;

a plate configured to cover an upper part of the accommodating box; and a storage tank configured to store a cleaning liquid; wherein:

the plate has an opening configured to expose a part of an upper surface of the foam in a state that the plate is locked to the accommodating box;

the accommodating box and the storage tank are fluidly connected to each other such that the cleaning liquid is allowed to flow from the storage tank into the accommodating box so as to reach the foam;

the accommodating box and the storage tank are adjacent to each other;

the accommodating box and the storage tank are partitioned from each other by a partition; and an upper end of the partition is positioned between an upper end of the foam and a lower end of the foam.

* * * * *